United States Patent
Kaneko et al.

(10) Patent No.: US 6,850,357 B2
(45) Date of Patent: Feb. 1, 2005

(54) ELECTROPHORETIC DISPLAY AND MANUFACTURING METHOD

(75) Inventors: Hiroki Kaneko, Hitachi (JP); Tetsuya Ooshima, Tokyo (JP); Tatsuya Sugita, Takahagi (JP); Shinichi Komura, Hitachi (JP); Shoichi Hirota, Hitachi (JP); Hiroshi Sasaki, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/758,464

(22) Filed: Jan. 15, 2004

(65) Prior Publication Data

US 2004/0184137 A1 Sep. 23, 2004

(30) Foreign Application Priority Data

Mar. 19, 2003 (JP) ........................................ 2003-076013

(51) Int. Cl.[7] .............................................. G02B 26/00
(52) U.S. Cl. ........................ 359/296; 430/32; 345/107; 204/600
(58) Field of Search ........................... 359/296; 430/32, 430/34, 38; 345/107, 105; 204/600, 450

(56) References Cited

U.S. PATENT DOCUMENTS 6,639,580 B1 * 10/2003 Kishi et al. ................. 345/107

FOREIGN PATENT DOCUMENTS

JP 11-202804 7/1999
JP 2001-343672 12/2001

* cited by examiner

Primary Examiner—Hung Xuan Dang
Assistant Examiner—Tuyen Tra
(74) Attorney, Agent, or Firm—Hogan & Hartson, LLP

(57) ABSTRACT

The present invention provides an electrophoretic display in which an insulating liquid is uniformly provided to the divided microspaces each corresponding to one pixel and display characteristics uniform over the display surface are actualized. The present invention includes a transparent first substrate 1 and a transparent second substrate 2 arranged with a predetermined gap therebetween, charged particles 6 dispersed in an insulating liquid 5 provided to the gap, and a first electrode 3 and a second electrode 4 arranged on either of the first substrate 1 and the second substrate 2, wherein liquid-repellency parts 8 and repellency-lowered parts 9 are arranged on the surface of the first substrate 1 and the surface of the second substrate 2, and the insulating liquid 5 is provided to the repellency-lowered parts on the surface of the first substrate 1 and the surface of the second substrate 2.

8 Claims, 15 Drawing Sheets

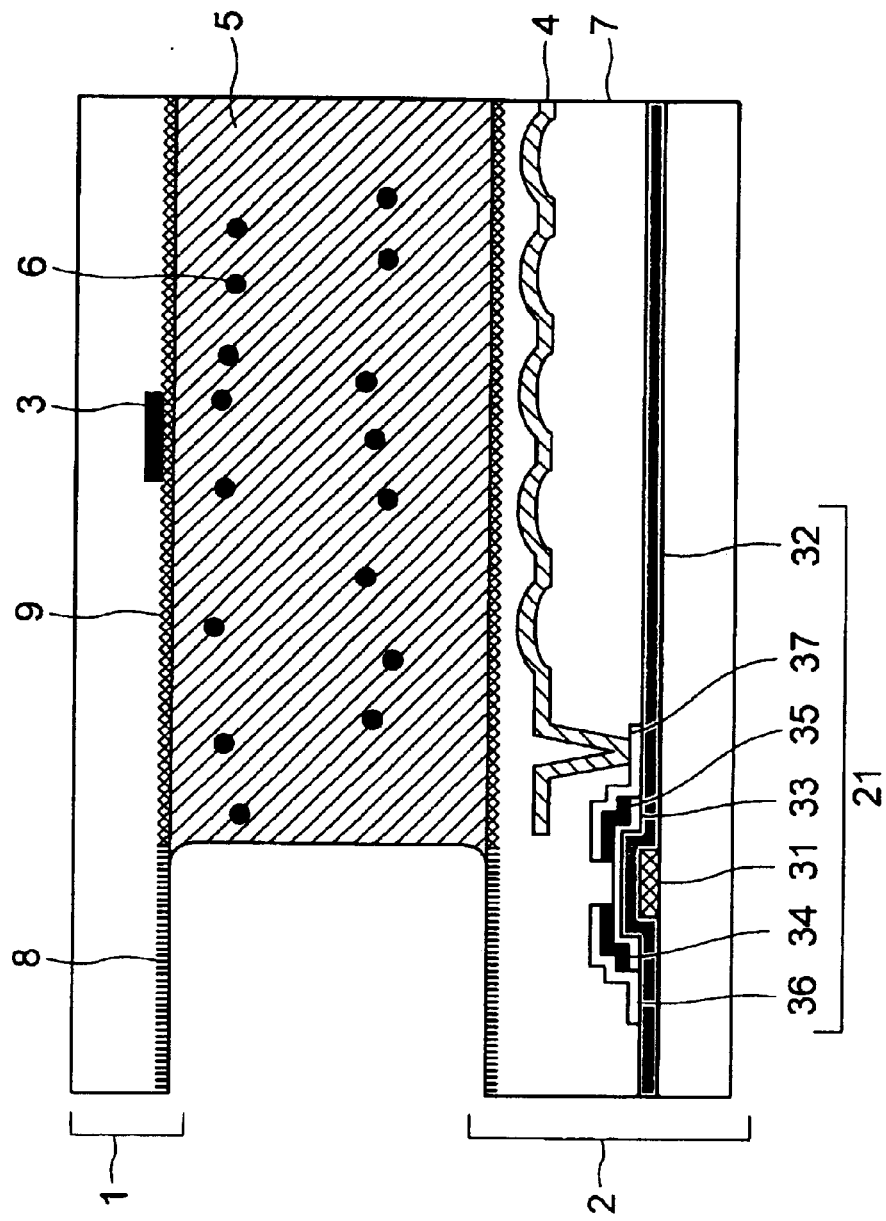

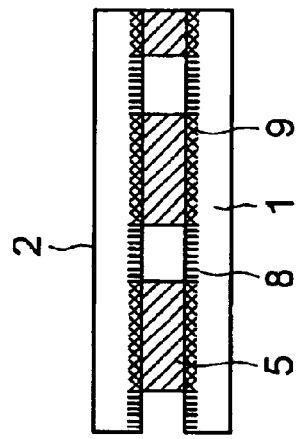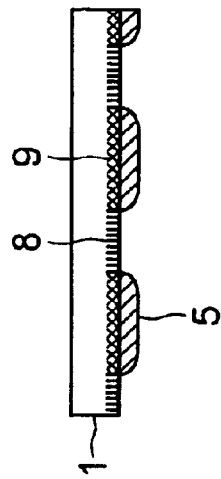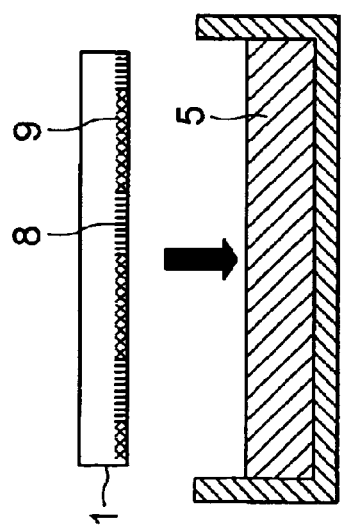

ELECTROPHORETIC DISPLAY AND MANUFACTURING METHOD

BACKGROUND OF THE INVENTION

The present invention relates to a display, particularly, an electrophoretic display in which display is effected by movement of charged particles in a liquid.

As a nonluminescent display, an electrophoretic display has been known which takes advantage of the electrophoretic phenomenon. The electrophoretic phenomenon is the one in which when an external electric field is applied to charged particles in a liquid, the charged particles migrate according to the charge polarity and the direction of the electric filed. As a conventional electrophoretic display, for example, an electrophoretic display has been known in which a colored insulating liquid is used (JP-A-2001-343672). The electrophoretic display disclosed in JP-A-2001-343672 has a structure in which one electrode and the other electrode are opposed to each other with a predetermined separation therebetween, and a liquid is contained in the gap therebetween. When a voltage is applied between the two electrodes, the charged particles are respectively attracted to one of the electrodes according to the charge polarities thereof. In this case, a colored insulating liquid is used so that an observer views either the color of the charged particles or the color of the liquid. Accordingly, an image is displayed by controlling the voltage applied between both electrodes.

As a conventional electrophoretic device in which no colored insulating liquid is used is disclosed, for example, in JP-A-11-202804. In JP-A-11-202804, the device has a structure in which one electrode is small in area and the other electrode is large in area. When a voltage is applied between both electrodes, charged particles are respectively attracted to one of the electrodes according to the charge polarities of the particles. In this case, an observer views the color of the charged particles and the color of either of the electrodes; more specifically, owing to the electrode area difference, the observer mainly views the color of the charged particles when the charged particles are attracted onto the electrode with a large area, while the observer views mainly the color of the electrode when the charged particles are attracted onto the electrode with a small area. Accordingly, by controlling the applied voltage, an image can be displayed.

The insulating liquid in the above described conventional electrophoretic devices is placed the respective compartments separated by partition walls; the partition walls serve to maintain the gap between the upper and lower substrates and limit the migration range of the charged particles respectively within the compartments made up of the partition walls to prevent the diffusion of the charged particles.

In the above described prior art electrophoretic displays, a large number of unit pixels of microspaces formed beforehand by division with the aid of the partition walls are provided with an insulating liquid, and the thus prepared pixels are arranged in a form of matrix to form a two-dimensional display area; however, such a configuration prevents uniform distribution of the insulating liquid over the microspaces, and accordingly it is difficult to achieve a uniform display characteristic over the surface of the display area. An object of the present invention is to provide an electrophoretic display in which the microspaces formed by division into pixels are uniformly provided with an insulating liquid so that a uniform display characteristic is achieved within the display surface.

SUMMARY OF THE INVENTION

For the purpose of achieving the above described object, in the present invention, transparent first and second substrates are arranged with a predetermined gap therebetween, an insulating liquid is provided in the gap, charged particles are dispersed in the above described insulating liquid, a first electrode and a second electrode are each arranged on either of the above described first substrate and the above described second substrate, liquid-repellency parts and repellency-lowered parts are provided on the surface of each of the above described first substrate and the above described second substrate, the insulating liquid is provided on the repellency-lowered parts of each of the above described first substrate and the above described second substrate, and accordingly the above described insulating liquid is uniformly distributed over the whole pixels.

Additionally, the present invention can take the following configuration.

(1) The patterning form of the liquid-repellency parts and the repellency-lowered parts on the surface of the above described first substrate and the corresponding pattering form of the above described second substrate are made identical with each other.

(2) Liquid-repellency parts and repellency-lowered parts are arranged on either of the above described first substrate surface and the above described second substrate surface, the other substrate surface being wholly made liquid-repellent.

(3) The above described insulating liquid provided on the repellency-lowered parts of the above described first substrate and the above described second substrate is provided by handling the individual pixels separately, or by handling a plurality of pixels as a group.

(4) The contact angle between each of the above described repellency-lowered parts flat in surface and the above described insulating liquid is made to be smaller than 90 degrees, and uneven structure is formed on the above described repellency-lowered parts.

(5) A plurality of posts is arranged on the above described liquid-repellency parts, and the surface of each of the above described posts is made to have liquid-repellency against the above described insulating liquid.

(6) Spacer members (beads or posts) are arranged to maintain the gap between the above described first substrate and the above described second substrate, and the surface of each of the spacer members is made to have liquid-repellency against the above described insulating liquid. Additionally, the spacer members are made to be nearly black.

(7) Banks higher than the surroundings thereof are arranged on the parts of the first substrate or the parts of the second substrate, or the parts of both substrates involved in the boundary parts between the adjacent compartments of the insulating liquid arranged on the above described repellency-lowered parts. Furthermore, the surface of each compartment of the above described insulating liquid is covered with a transparent resin film.

(8) A resin is provided to the gaps between the above described adjacent compartments of the insulating liquid covered with the above described resin film. The resin provided to the gaps between the above described adjacent compartments of the insulating liquid covered with the above described resin film is made to be nearly black. Additionally, the resin provided to the gaps between the adjacent compartments of the insulating liquid covered with the above described resin film is made to have conductivity so as to double as the above described first electrode.

(9) The gaps between the compartments of the insulating liquid covered with the above described resin film and the above described first substrate and the gaps between the compartments of the insulating liquid covered with a resin are filled with a transparent conductive resin so as double as the above described first electrode.

(10) Liquid-repellency parts and repellency-lowered parts are arranged on the above described surface of the second substrate, the surfaces of the first electrode and the second electrode both arranged on the above described second substrate, and the surface of the above described second substrate, and the above described insulating liquid is provided to the repellency-lowered parts of the above described second substrate surface; the surface of the compartments of the insulating liquid are covered with a resin film.

(11) A transparent conductive resin is provided on the surface of the above described compartments of the insulating liquid covered with the above described resin film and in the gaps therebetween.

(12) Liquid-repellency parts and repellency-lowered parts are arranged on the surface of the above described second substrate, on the surfaces of the second electrode arranged on the above described second substrate, and on the surface of the above described second substrate, and the above described insulating liquid is provided to the repellency-lowered parts of the above described second substrate surface; the surface of the compartments of the above described insulating liquid are covered with a resin film; a transparent conductive resin is provided on the surface of the compartments of the above described insulating liquid each covered with the above described resin and in the gaps therebetween so as to also be the first electrode; moreover, a transparent nonconductive resin layer on the surface of the above described conductive resin.

(13) The above described compartments of the insulating liquid covered with the above described resin film are made to be nearly semispherical.

(14) Active elements are arranged on the above described second substrate and the display is switched over by means of the active matrix driving.

According to the above described configurations, an electrophoretic display can be provided which actualizes a uniform display characteristic over the display surface.

Incidentally, the above described electrophoretic display can be manufactured at least on the basis of the following steps of: (i) providing liquid-repellency parts on the surface of the first substrate or the second substrate, (ii) forming repellency-lowered parts by irradiating light onto the parts where the insulating liquid is to be provided so as for the liquid repellency of the parts to be lowered, and (iii) providing the insulating liquid to the repellency-lowered parts formed by the above described light irradiation.

Other representative steps of manufacturing the electrophoretic display of the present invention are detailed as follows.

(a) The above described steps (i) and (ii) are respectively;
(i) the step in which a layer to be used in the above step (ii) for absorbing the light of 250 nm or longer in wavelength to lower the liquid repellency is provided on the surfaces of the first substrate and the second substrate, on which layer another layer formed of an amorphous fluoro-containing polymer is provided, and
(ii) the step in which the light of 250 nm or longer in wavelength is irradiated onto the parts dividing the insulating liquid into compartments and the liquid repellency of the light irradiated parts is lowered.

(b) The above described step (iii) is a step in which the above described insulating liquid is sealed by vacuum evacuating the space formed with a predetermined gap between the above described first substrate and the above described second substrate or by pressurizing the insulating liquid.

(c) Alternatively, the above described step (iii) is a step in which the above described insulating liquid is made to adhere by rolling a roller onto which a prescribed thickness of the insulating liquid is adhered beforehand, on the above described substrate.

(d) Alternatively, the above described step (iii) is a step in which the above described insulating liquid is made to adhere by soaking the surfaces of the above described substrates in the insulating liquid stored in a vessel.

(e) Alternatively, the above described step (iii) is a step in which the above described insulating liquid is made to adhere by flying the droplets of the insulating liquid by means of inkjetting.

(f) In the above steps (a) to (e), at least used are:
(1) the step in which added is a resin to be used in the following step (2) that is cured by light irradiation or by heating, and
(2) the step in which the resin is cured on the above described surface of the compartments of the insulating liquid by means of light irradiation or heating, and accordingly the above described compartments of the insulating liquid are covered by the resin.

The use of the manufacturing methods described above permits providing an electrophoretic display in which a uniform display characteristic is actualized in the display surface, as above described in the above (1) to (14).

Other objects, features and advantages of the invention will become apparent from the following description of the embodiments of the invention taken in conjunction with the accompanying drawings.

BRIEF DESCRIPTION OF DRAWINGS

FIG. 18 is a schematic sectional view along the line segment A–A' shown in FIG. 17;

FIGS. 22A, 22B and 22C are schematic view illustrating yet other manufacturing steps of the electrophoretic display of the present invention;

DESCRIPTION OF SYMBOLS

1: First substrate, 2: Second substrate, 3: First electrode, 4: Second electrode, 5: Insulating liquid, 6: Charged particle, 7: Insulating layer, 8: Liquid-repellency part, 9: Repellency-lowered part, 10: Electric circuit, 11: Post, 12: Resin film, 13: Resin, 14: Conductive resin, 15: Resin, 16: Sealing opening, 17: Gas charging opening, 18: Roller, 19: Inkjet device, 20: Pixel, 21: Thin film transistor, 22: Drain wire, 23: Gate wire, 24: Drain driver, 25: Gate driver, 26: Bank, 27: Photomask, 28: UV light, 31: Gate electrode, 32: Gate insulating film, 33: Semiconductor layer, 34, 35: Contact layer, 36: Drain electrode, 37: Source electrode

DETAILED DESCRIPTION OF THE INVENTION

Now, detailed description will be made below on the embodiment of the electrophoretic display of the present invention with reference to the accompanying drawings.

EXAMPLE 1

Figure 1A:
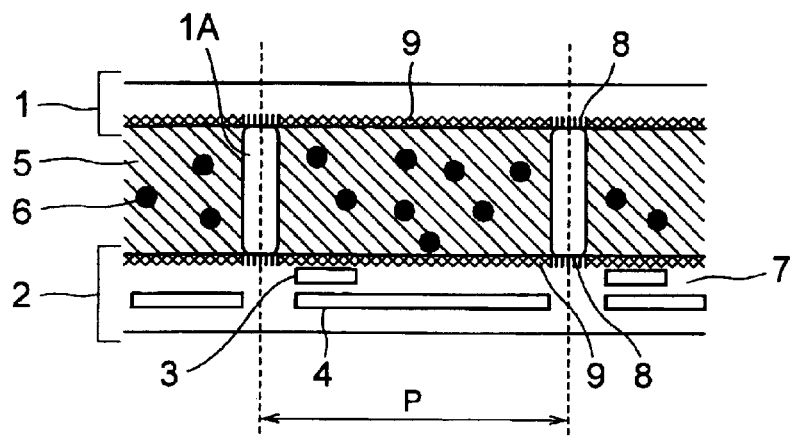
FIGS. 1A, 1B and 1C are schematic sectional view illustrating Example 1 of the electrophoretic display of the present invention.
Figure 1B:
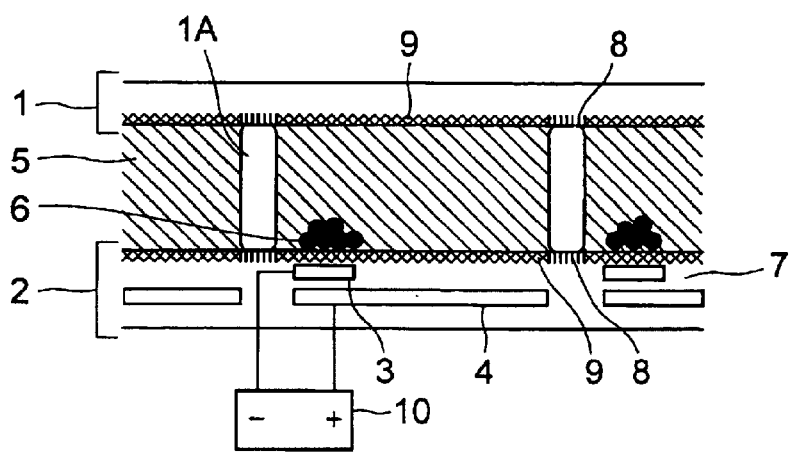

FIG. 1 is a view illustrating the first example of the electrophoretic display of the present invention; FIG. 1A is a sectional view of the part around a pixel, FIGS. 1B and C are the views illustrating the operation of FIG. 1A. The range P shown in FIG. 1A corresponds to one pixel of the electrophoretic display. As FIG. 1A shows, the electrophoretic display of the present invention comprises a first substrate 1 and a second substrate 2 both arranged with an appropriate gap therebetween, and a transparent insulating liquid 5 provided in the gap in which liquid colored charged particles 6 are dispersed. The first substrate 1 is transparent and a first electrode 3 and a second electrode 4 are arranged on the second substrate 2, the area of the first electrode 3 is smaller than the area of the second electrode 4, and these two electrodes are separated with an insulating layer 7. An electric circuit 10 is connected to the first electrode 3 and the second electrode 4 with a polarity shown in the figure. The display has a partition wall 1A between adjacent pixels. In FIG. 1, the partition wall 1A is made of a gas such as air, an inert gas or the like.

When a voltage is applied between the first electrode 3 and the second electrode 4 by the electric circuit 10, an electric filed is generated between the two electrodes, and the charged particles 6 move either from above the first electrode 3 to above the second electrode 4 or from above the second electrode 4 to above the first electrode 3. When the charged particles 6 are positively charged, as FIG. 1B shows, if the potential of the first electrode 3 is made lower than that of the second electrode 4 by means of the electric circuit 10, the charged particles 6 gather above the first electrode 3 smaller in area. In this case, when viewed from the first substrate 1, the electrophoretic display exhibits either the color of the second electrode 4 or the color of the insulating layer 7.

Figure 1C:
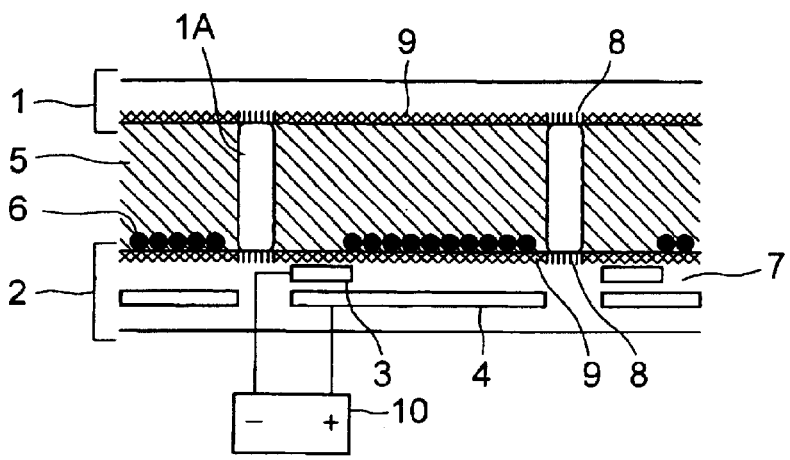

On the other hand, as FIG. 1C shows, if a voltage is applied by means of the electric circuit 10 so as for the potential of the first electrode 3 to be made higher than that of the second electrode 4, the charged particles 6 spread above the second electrode 4 larger in area. In this case, when viewed from the first substrate 1, the electrophoretic display exhibits the color of the charged particles. For example, if the color of the charged particles 6 is black, the insulating layer 7 is transparent, and the second electrode 4 is high in reflectivity over the whole visible light region, white display is effected in the case of FIG. 1B while black display is effected in the case of FIG. 1C. In this connection, if only the color and brightness of the charged particles 6 and those of the second electrode 4 can be observed with a sufficient contrast, the respective colors may take any combinations.

Although for the first electrode 3, an electrode having arbitrary reflection characteristics may be used, a black or brown electrode is preferable because the reflected light amount from the surface of such an electrode is small to raise the contrast ratio. Additionally, in the case where the second electrode 4 is used as a reflector, the luminance of the display can be raised by appropriately nodularizing the surface of the second electrode 4 so that the light incident from the surroundings is made to be reflected effectively along the direction normal to the front surface of the display. Yet additionally, an effect equivalent to the effect which would be obtained by coloring the second electrode 4 can be obtained by making the reflection characteristics in the visible light region of the second electrode 4 have wavelength dispersion and by making the transmittance in the visible light region of the insulating layer 7 have wavelength dispersion, instead of coloring the second electrode 4.

Furthermore, a full color electrophoretic display can be obtained as follows: the present example is used as one pixel (color subpixel) and the individual pixels are respectively provided with the second electrodes 4 mainly reflecting the lights in the red, green and blue wavelength regions, with the insulating layers 7 mainly transmitting the lights in the red, green and blue wavelength regions, or with the color filters (not shown in the figure) arranged on the first substrate and transmitting the lights in the red, green and blue wavelength regions; black charged particles 6 are used; and voltages are applied to these pixels independently.

Additionally, by arranging an insulating layer 7 between the first electrode 3 and the insulating liquid 5 and between the second electrode 4 and the insulating liquid 5, the electrochemical reactions expected to occur between the first electrode 3 and the insulating liquid 5 and between the second electrode 4 and the insulating liquid 5 can be prevented; however, the insulating layer 7 is necessary or unnecessary depending on the combination of the two electrodes and the insulating liquid 5.

EXAMPLE 2

Figure 2:
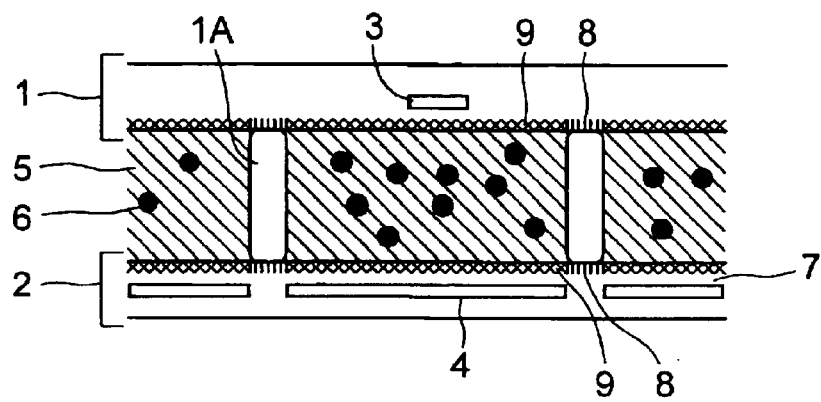
FIG. 2 is a schematic sectional view, similar to FIG. 1, illustrating Example 2 of the electrophoretic display of the present invention.

FIG. 2 is a schematic sectional view, similar to FIG. 1, illustrating Example 2 of the electrophoretic display of the present invention. In the present example, as FIG. 2 shows, the first electrode 3 is arranged on the first substrate 1, while in Example 1 the first electrode 3 is arranged on the second substrate. Even this configuration of the present example can effect a display similarly to the above described example.

EXAMPLE 3

Figure 3:
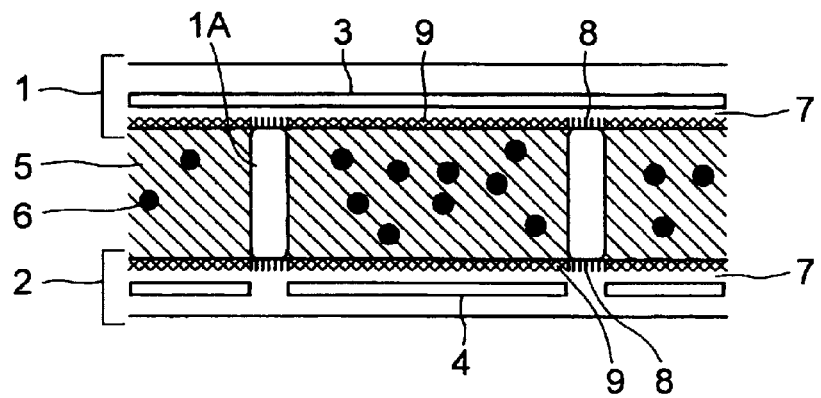
FIG. 3 is a schematic sectional view, similar to FIG. 1, illustrating Example 3 of the electrophoretic display of the present invention.

FIG. 3 is a sectional view, similar to FIG. 1, illustrating Example 3 of the electrophoretic display of the present invention. In the present example, the first electrode 3 is commonized on the first substrate 1 and a colored insulating liquid is used, while the first electrode 3 is arranged on the second substrate in Example 1. In the configuration of the present example, owing to the contrasting combination of the colors of the colored insulating liquid 5 and the colored charged particles 6, the color of the particles is displayed when the charged particles 6 spread over the first electrode 3, while the color of the colored insulating liquid 5 is displayed when the charged particles 6 spread over the second electrode 4.

Additionally, the second substrate 2 and the second electrode 4 in each of the electrophoretic displays of the above described examples can be made transparent and these electrophoretic displays thus modified can be used as transmission type electrophoretic displays.

In the electrophoretic displays of Examples 1 to 3 of the present invention described above with reference to the above FIGS. 1 to 3, the liquid-repellency parts 8 having the repellency against the insulating liquid 5 and the repellency-lowered parts 9 having the wettability to the insulating liquid 5 are provided on the surface of the first substrate 1 and the surface of the second substrate 2. As FIGS. 1 to 3 show, the repellency-lowered parts 9 are arranged on parts of the substrate surface to be pixels and the liquid-repellency parts 8 are arranged on the boundary parts between the pixels; accordingly, the insulating liquid 5 provided on each of the repellency-lowered parts 9 remains in the part concerned, but never moves over the adjacent liquid-repellency parts 8. More specifically, even with such a simple structure in which the partition walls 1A are formed of a gas so that no substantial walls are present, an electrophoretic display can be actualized in which the insulating liquid 5 is divided into compartments of the insulating liquid 5 each corresponding to one pixel.

The liquid-repellent parts 8 and repellency-lowered parts 9 referred to here respectively refer to the parts having relatively high contact angles and the parts having relatively low contact angles to the insulating liquid 5; no absolute values of the contact angles are specified. Additionally, in Examples 1 to 3 of the present invention, the pattern shapes of the liquid-repellency parts 8 and repellency-lowered parts 9 arranged on the first substrate 1 and the pattern shapes of the same arranged on the second substrate 2 are made to coincide with each other; the insulating liquid 5 is provided between the pairs of the opposing repellency-lowered parts 9 on both substrates, resulting in an effect that the division of the insulating liquid 5 into compartments can be made more firmly.

EXAMPLE 4

Figure 4:
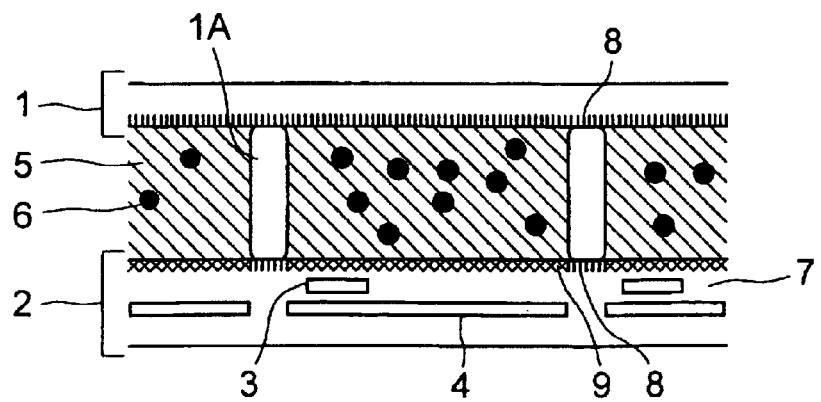
FIG. 4 is a schematic sectional view, similar to FIG. 1, illustrating Example 4 of the electrophoretic display of the present invention.

FIG. 4 is a schematic sectional view, similar to FIG. 1, illustrating Example 4 of the electrophoretic display of the present invention. In the present example, the whole surface of the first substrate 1 is made to be a liquid-repellency part 8, while liquid-repellency parts 8 and repellency-lowered parts 9 are arranged on the surface of the second substrate 2. Adoption of this configuration provides the effect that the insulating liquid 5 is divided into compartments with the aid of the liquid-repellency parts 8 and the repellency-lowered parts 9 on the second substrate 2, and the contact of the adjacent compartments of the insulating liquid 5 through the intermediary of the first substrate 1 is prevented. Furthermore, the adoption of the same configuration permits omitting the process for patterning the liquid-repellency parts 8 and the repellency-lowered parts 9 on the first substrate 1. On the contrary, the same effect can be obtained by patterning the liquid-repellency parts 8 and the repellency-lowered parts 9 on the first substrate 1 and arranging only the liquid-repellency part 8 on the second substrate 2 (not shown in the figure).

EXAMPLE 5

In the electrophoretic display of the present example, the liquid-repellency parts 8 and repellency-lowered parts 9 are arranged respectively for the groups each consisting of a plurality of pixels, although in Examples 1 to 4 the insulating liquid 5 is divided into compartments each allotted to one pixel. This configuration permits actualizing an electrophoretic display in which the insulating liquid 5 is divided into compartments each allotted to a group of a plurality of pixels, with a simple structure without partition walls (not illustrated with a figure). This configuration yields an effect that the production efficiency is improved because the area of one of the compartments generated by equal division becomes large.

EXAMPLE 6

In the electrophoretic display of the present example, the insulating liquid 5 is dropped onto the flat repellency-lowered part 9 shown in Examples 1 to 4 and the relevant contact angle is measured, and the surface of the repellency-lowered parts 9 are nodularized in the case where the measured contact angle is smaller than 90 degrees (not illustrated with a figure). The nodularized shape of the repellency-lowered parts 9 leads to an effect that the contact angle of the insulating liquid 5 in relation to the repellency-lowered parts 9 is lowered (the wettability is increased), and the division into compartments can be made more firmly. The above mentioned nodularized shape may be derived from the nodularized shape of the material itself forming the repellency-lowered parts 9, and alternatively, if the second electrode 4 is used as a reflector having a modularized shape, this nodularized shape can also be utilized.

EXAMPLE 7

Figure 5:
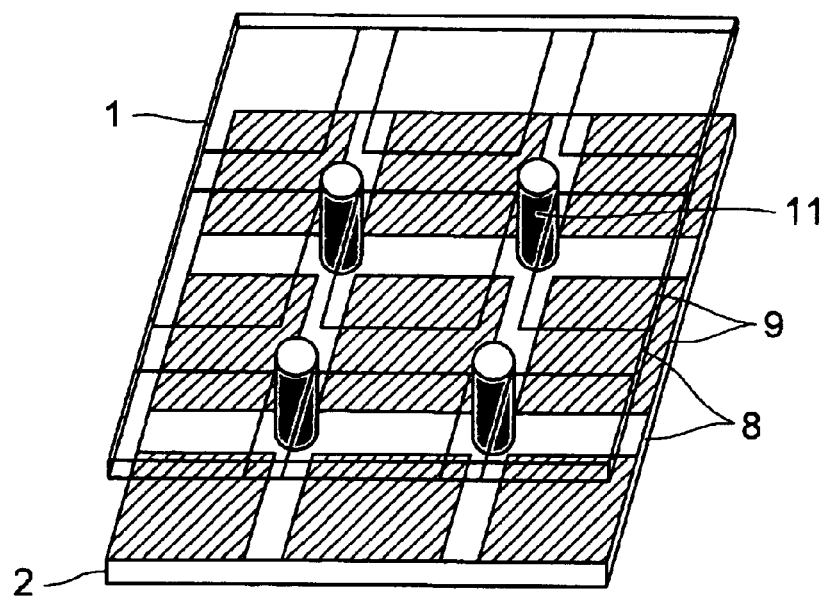
FIG. 5 is an oblique perspective view schematically illustrating a part of the display area of Example 7 of the electrophoretic display of the present invention.

FIG. 5 is an oblique perspective view schematically illustrating a part of the display area of Example 7 of the electrophoretic display of the present invention. In the electrophoretic display of the present example, for the purpose of maintaining at a predetermined value the gap between the first substrate 1 and the second substrate 2, posts 11 are arranged as spaces on the liquid-repellency parts 8 in the constitution of the electrophoretic display in Example 3. The posts 11 are arranged on the mutual boundary portions between the compartments of the insulating liquid. The arrangement of the posts 11 on the liquid-repellency parts 8 preferably permits maintaining the predetermined gap without reducing the opening ratio (the area of the repellency-lowered parts 9). Furthermore, by providing the surface of the posts 11 with the repellency against the insulating liquid 5, the mutual contact between the adjacent compartments of the insulating liquid 5 through the intermediary of surface of the posts 11 is limited and accordingly the division into the compartments can be made more firm. Additionally, by making the color of the posts 11 nearly black, undesired reflected light and transmitted light can be reduced in intensity so that an electrophoretic display having a high contrast can be obtained.

In FIG. 5, the posts 11 are arranged on the liquid-repellency parts corresponding to the four corners of each repellency-lowered part 9; however, the number of ports to be arranged and the arrangement locations are not limited to those illustrated in FIG. 5. Although in FIG. 5 the same pattern shapes of the liquid-repellency parts 8 and the repellency-lowered parts 9 are shown on the first substrate 1 and the second substrate 2, a similar effect can be obtained when the whole surface of one of these substrate is made to be a liquid-repellency part.

EXAMPLE 8

In the present example, beads are used as spacer members (not illustrated with a figure) in place of the above described posts 11 to maintain at a predetermined value the gap between the first substrate 1 and the second substrate 2 in the example described with reference to FIG. 5. The beads are arranged randomly between the two substrates, so that the beads are sometimes arranged between the compartments, each corresponding to one of the abutting pixels, of the insulating liquid; thus, by making the surface of the beads have the liquid repellency, the mutual contact between the adjacent compartments of the insulating liquid through the intermediary of the surface of the beads is limited, and hence the division into the compartments can be made more firm. Additionally, there is an effect that the liquid repellency imparted to the beads makes the beads stably stay in the locations small in the area of contact with the insulating liquid so as for the beads to stay in the liquid-repellency parts so that the reduction of the opening ratio can be avoided. Additionally, by making the color of the beads nearly black, similarly to the case where the above described posts are made black, undesired reflected light and transmitted light can be reduced in intensity so that an electrophoretic display having a high contrast can be obtained.

EXAMPLE 9

Figure 6:
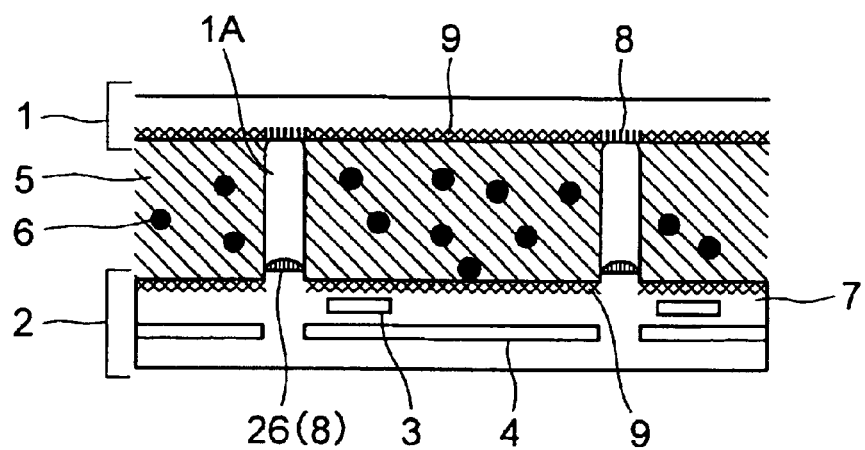
FIG. 6 is a schematic sectional view, similar to FIG. 1, illustrating Example 9 of the electrophoretic display of the present invention.

FIG. 6 is a schematic sectional view, similar to FIG. 1, illustrating Example 9 of the electrophoretic display of the present invention. In the electrophoretic display of the present example, banks 26 more convex than the surroundings thereof are arranged in the boundary parts between the compartments of the insulating liquid 5. Such an arrangement of the banks 26 limits the mutual contact between the adjacent compartments of the insulating liquid 5 each corresponding to one of the pixels so that the division into the compartments can be made more firm. Additionally, the just mentioned arrangement permits preventing an effect that the insulating liquid 5 adhered to the liquid-repellency parts 9 flows over the banks 26 into either of the adjacent compartments of the insulating liquid 5 so that eventually part of the insulating liquid 5 remains in the liquid-repellency parts 8. Additionally, although in FIG. 6 the banks 26 are arranged exclusively in the liquid-repellency parts 8 of the second substrate 2, the banks 26 may be arranged on the first substrate 1 or on both substrates (not illustrated with a figure).

EXAMPLE 10

Figure 7:
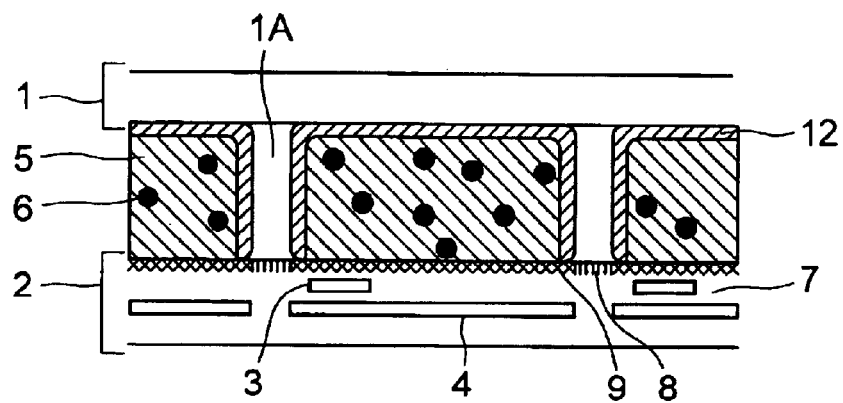
FIG. 7 is a schematic sectional view, similar to FIG. 1, illustrating Example 10 of the electrophoretic display of the present invention.

FIG. 7 is a schematic sectional view, similar to FIG. 1, illustrating Example 10 of the electrophoretic display of the present invention. In the present example, the surface of each of the compartments of the insulating liquid 5 in the above described examples (Examples 1 to 9) is covered with a resin film 12. The covering of the compartments of the insulating liquid 5 with a resin film 12 in the present example prevents the mutual contact of the adjacent compartments of the insulating liquid even when the substrates are compressed from the outside so as for the gap between both substrates to be narrower, and hence firm compartment structure can be actualized. Additionally, although in FIG. 7 the liquid-repellency parts 8 and the repellency-lowered parts 9 are patterned on the second substrate 2, an electrophoretic display having an effect similar to the above described can be obtained by patterning the liquid-repellency parts 8 and the repellency-lowered parts 9 on the first substrate 1 (not illustrated with a figure) in contrast to the above described structure.

EXAMPLE 11

Figure 8:
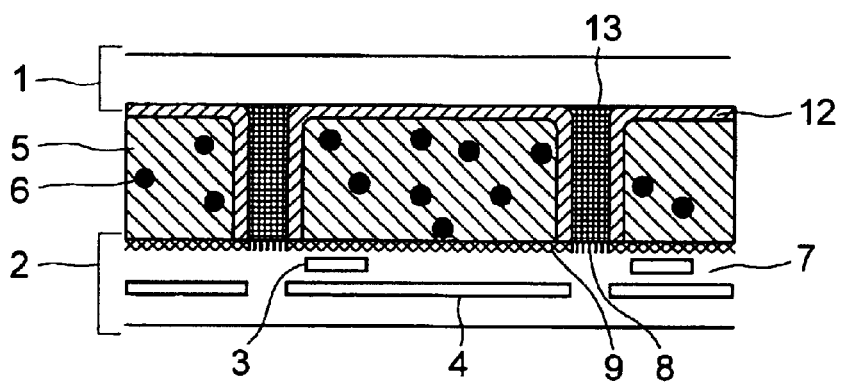
FIG. 8 is a schematic sectional view, similar to FIG. 1, illustrating Example 11 of the electrophoretic display of the present invention.

FIG. 8 is a schematic sectional view, similar to FIG. 1, illustrating Example 11 of the electrophoretic display of the present invention. In the present example, resin 13 is arranged in place of the partition walls 1A formed of air, an inert gas or the like in the example illustrated in FIG. 7. The arrangement of the resin 13 permits maintaining more firmly the gap between the first substrate 1 and the second substrate 2, and yields an effect that the mutual contact of the adjacent compartments of the insulating liquid 5 can be prevented even when both substrates are compressed from the outside, and hence more firm separation into compartments is actualized. Incidentally, by making the resin 13 nearly black, an effect occurs that undesired reflected light and transmitted light from the resin 13 can be reduced in intensity, and accordingly an electrophoretic display having a high contrast can be obtained.

EXAMPLE 12

Figure 9:
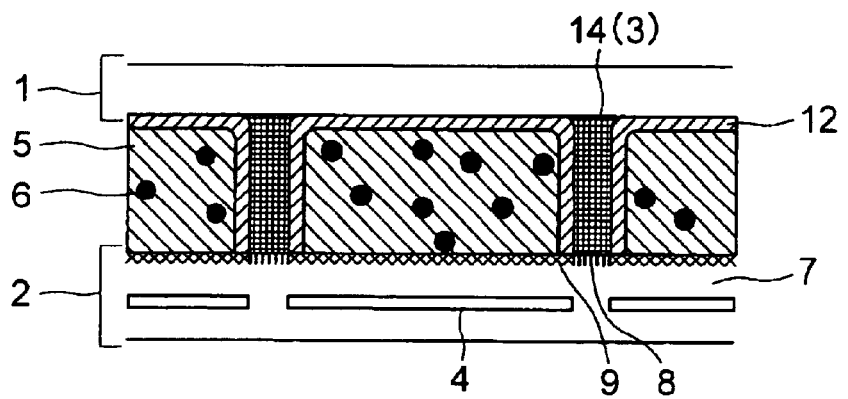
FIG. 9 is a schematic sectional view, similar to FIG. 1, illustrating Example 12 of the electrophoretic display of the present invention.

FIG. 9 is a schematic sectional view, similar to FIG. 1, illustrating Example 12 of the electrophoretic display of the present invention. In the present example, partition walls of a conductive resin 14 are arranged respectively in the gaps between the compartments of the insulating liquid 5 each covered with a resin film 12 in the example illustrated in FIG. 8, and the partition walls of a conductive resin 14 are made to respectively be the common electrodes of the pixels. Incidentally, the conductive resin 14 can be made to double as the electrodes corresponding to the first electrodes 3. Making the conductive resin 14 double as the first electrodes 3, in an electrophoretic display using a transparent insulating liquid 5, gives rise to an effect of increasing the opening ratio and hence can lead to actualization of an electrophoretic display having a bright display image. Such doubling of the conductive resin partition walls as the first electrodes 3 also gives rise to an effect that a step for forming the first electrodes 3, as in the above described examples, above the second electrodes 4, or on the first substrate 1 or the second substrate 2, can be omitted and the structure of the display can be simplified.

EXAMPLE 13

Figure 10:
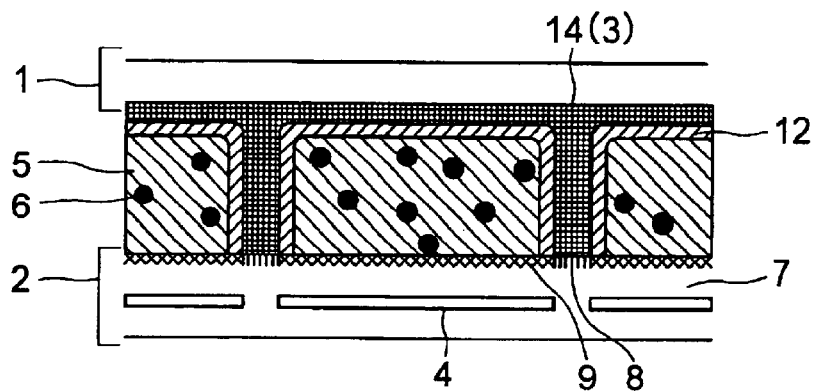
FIG. 10 is a schematic sectional view, similar to FIG. 1, illustrating Example 13 of the electrophoretic display of the present invention.

FIG. 10 is a schematic sectional view, similar to FIG. 1, illustrating Example 13 of the electrophoretic display of the present invention. In the present example, a layer of the conductive resin 14 is arranged in the gap between the group of the gaps (partition walls) associated with the compartments of the colored insulating liquid 5, each covered with a resin film 12, and the first substrate 3. The part thus formed of the conductive resin 14 is made to be a common electrode to double as the first electrode 3. The configuration of the present example gives rise to an effect that the step for forming the first electrodes 3 on the first substrate 1 can be omitted and the structure of the display can be simplified.

EXAMPLE 14

Figure 11:
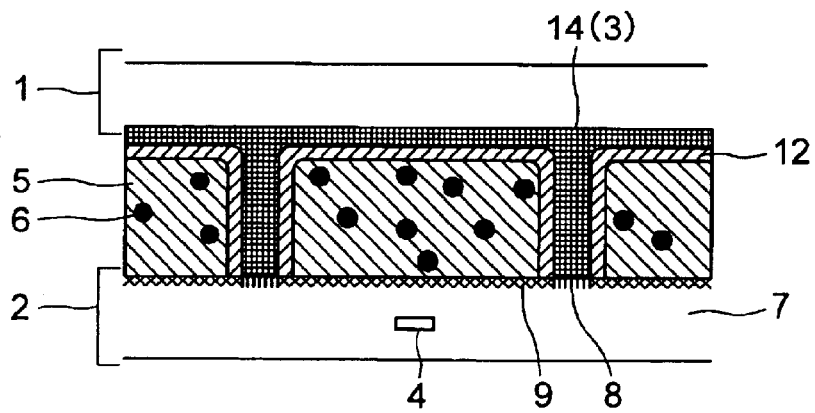
FIG. 11 is a schematic sectional view, similar to FIG. 1, illustrating Example 14 of the electrophoretic display of the present invention.

FIG. 11 is a schematic sectional view, similar to FIG. 1, illustrating Example 14 of the electrophoretic display of the present invention. The present example has the configuration similar to that in FIG. 10, in which, similarly to the configurations shown in FIGS. 8 to 10, a layer of the conductive resin 14 is arranged between the gaps (partition walls) associated with the compartments of the transparent insulating liquid 5, each covered with a resin film 12 and the gap between the compartments of the insulating liquid and the first substrate 3, and moreover, the size of the second electrode 4 arranged on the second substrate 2 is made small. According to the present example, in addition to an effect similar to the effect obtained in Example 13, the transmittance can be improved owing to the small area of the second electrode 4.

EXAMPLE 15

Figure 12:
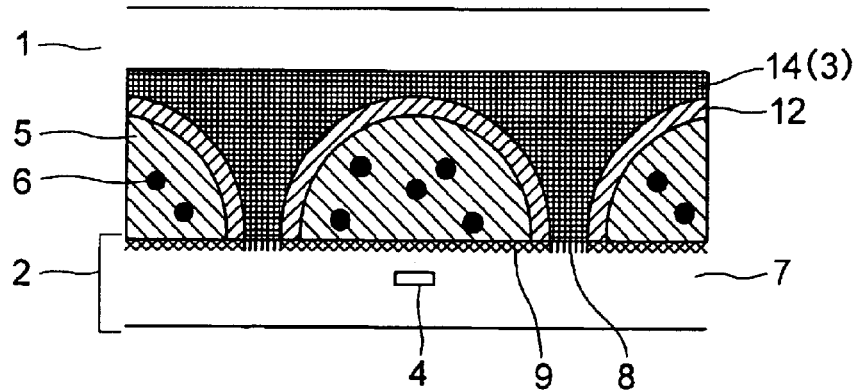
FIG. 12 is a schematic sectional view, similar to FIG. 1, illustrating Example 15 of the electrophoretic display of the present invention.

FIG. 12 is a schematic sectional view, similar to FIG. 1, illustrating Example 15 of the electrophoretic display of the present invention. In the present example, the compartments of the insulating liquid 5 each covered with a resin film 12 are made nearly semispherical and a second electrode 4 is arranged on the central part of each of these semispheres, and a conductive resin 14 fills the partition wall parts (gap parts) between the adjacent compartments of the insulating liquid 5 and the gap between the first substrate 1 and these compartments. The part formed of the conductive resin 14 may double as the first electrode 3 as the common electrode for the individual pixels. There occurs an effect that this configuration uniformizes the electric field distribution between the first electrode 3 (the common electrode: the conductive resin part 14 and the second electrode 4 so that the charged particles spread uniformly all over the surface of the first electrode 3. Additionally, when the refractive index of the insulating liquid 5 is lower than the refractive indexes of the above described resins 12 and 14, the semispherical structure has an effect of a convex lens to enhance the reflectivity for white display so that an electrophoretic display higher in contrast ratio can be obtained.

EXAMPLE 16

Figure 13:
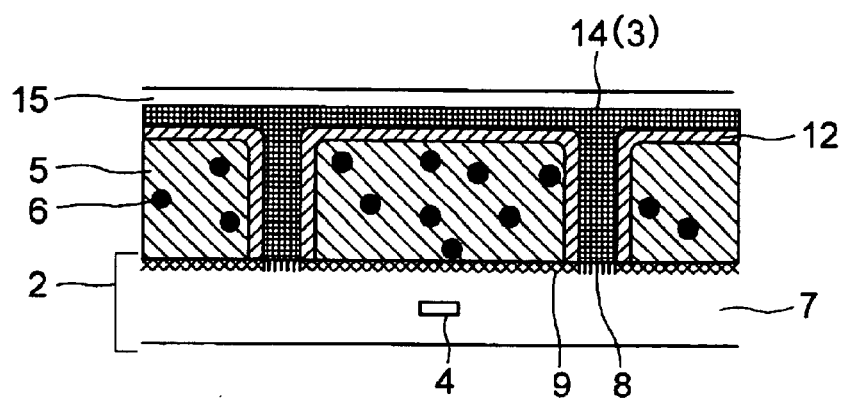
FIG. 13 is a schematic sectional view, similar to FIG. 1, illustrating Example 16 of the electrophoretic display of the present invention.

FIG. 13 is a schematic sectional view, similar to FIG. 1, illustrating Example 16 of the electrophoretic display of the present invention. The present example has a configuration in which the first substrate 1 in each of the above described examples is omitted, and a conductive resin 14 fills the partition wall parts (gap parts) associated with the compartments of the transparent insulating liquid 5 each covered with a resin film 12, the conductive resin 14 doubles as the first electrode 3, and the surface of the conductive resin part is covered with an insulating film 15. The use of the insulating film 15 in place of the first substrate 1 permits actualizing an electrophoretic display light in weight, low in profile, and flexible.

EXAMPLE 17

Figure 14:
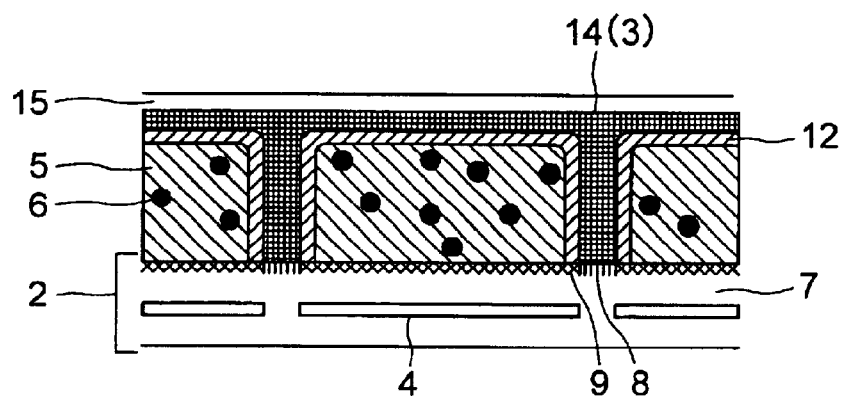
FIG. 14 is a schematic sectional view, similar to FIG. 1, illustrating Example 17 of the electrophoretic display of the present invention.

FIG. 14 is a schematic sectional view, similar to FIG. 1, illustrating Example 17 of the electrophoretic display of the present invention. The present example has a structure in which, similarly to Example 15, the surface of the part formed of the conductive resin 14, replacing the first substrate 1 and doubling as the first electrode 3, is covered with an insulating film 15, and the size of the second electrode 4 arranged on the second substrate 2 is made small. According to the present example, in addition to an effect similar to the effect obtained in Example 15, the transmittance can be improved owing to the small area of the second electrode 4 so that an electrophoretic display having a bright display image can be actualized.

EXAMPLE 18

Figure 15:
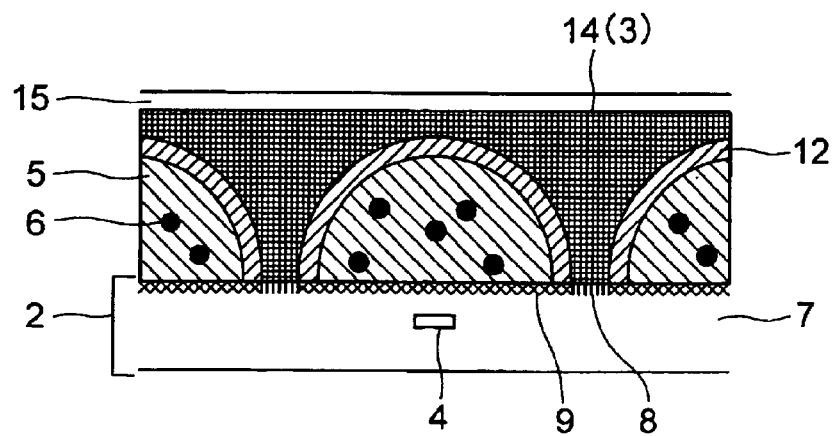
FIG. 15 is a schematic sectional view, similar to FIG. 1, illustrating Example 18 of the electrophoretic display of the present invention.

FIG. 15 is a schematic sectional view, similar to FIG. 1, illustrating Example 18 of the electrophoretic display of the present invention. The present example has a configuration in which, similarly to the example illustrated in FIG. 12, the shape of the compartments of the insulating liquid 5 is made nearly semispherical, a second electrode 4 is arranged on the central part of each of the semispheres, and a conductive resin 14 fills the partition wall parts (gap parts) between the adjacent compartments of the insulating liquid 5 and the gap between the first substrate 1 and these compartments. The part formed of the conductive resin 14 may double as the first electrode 3 as the common electrode for the individual pixels. Additionally, the first substrate 1 in FIG. 12 is omitted and the surface of the part formed of the conductive resin 14 is covered with an insulating film 15. The configuration of the present example permits achieving an effect obtained with a combination of the example associated with FIG. 12 and the example associated with FIG. 14.

An arbitrary image can be displayed by arranging in a matrix form the pixels of any one of the above described electrophoretic displays in the examples of the present invention, and by voltage controlling each of the pixels separately. As the driving scheme involved in the control, either an active driving or a passive driving can be adopted; in consideration of the effect of cross-talk possible in a case where the number of the pixels is large, an active driving is preferable. Now, description will be made below on some examples each adopting an active driving.

Figure 16:
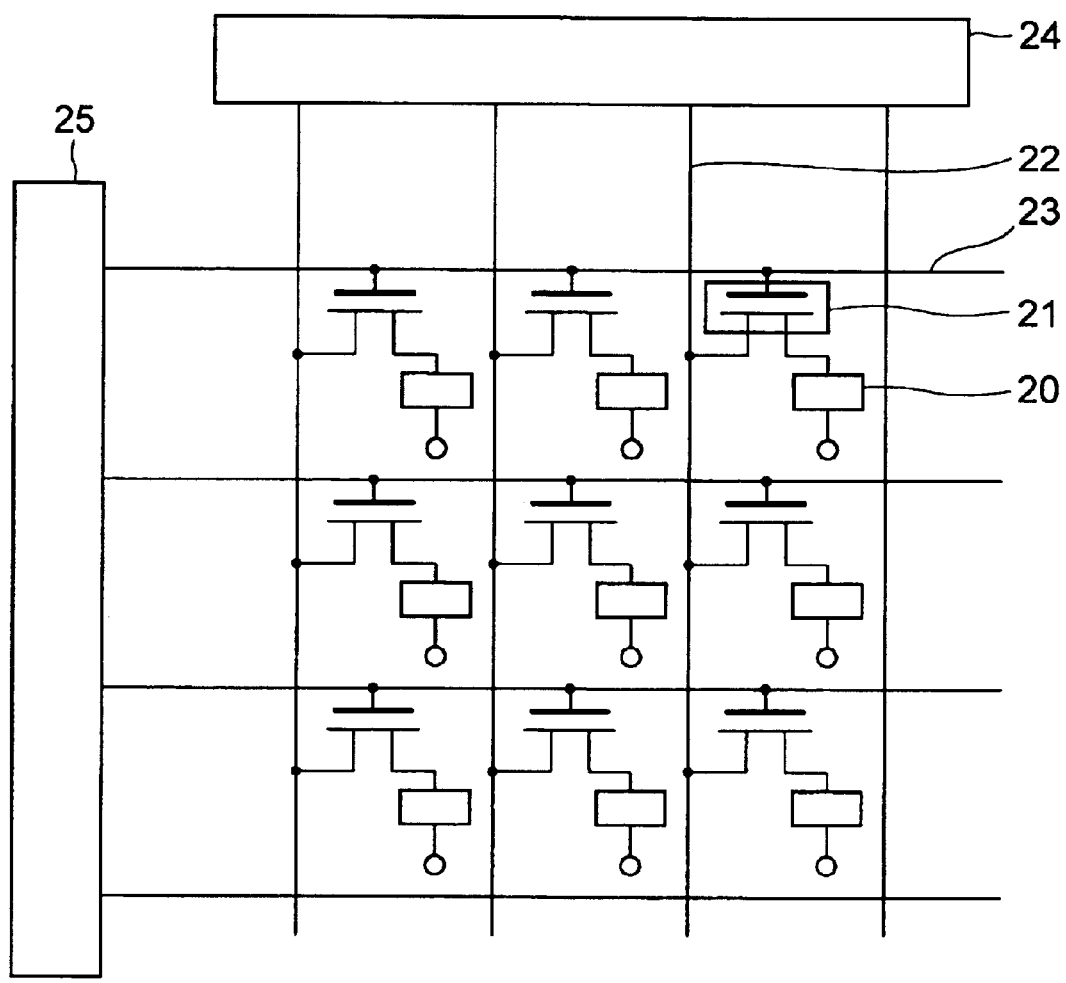
FIG. 16 is a block diagram illustrating an example of the driving circuit of the electrophoretic display of the present invention.

FIG. 16 is a block diagram illustrating an example of the driving circuit of the electrophoretic display of the present invention. Reference numeral 20 denotes a pixel, one of the first electrode and the second electrode of each pixel 20 is connected to a thin film transistor 21, a drain wire 22 and a gate wire 23 for the purpose of applying voltage, and the other electrode is connected and commonized so as to have an identical voltage between the adjacent pixels. The voltage applied between the first electrode and the second electrode of each pixel 20 is controlled by a driver 24 for the drain wiring 22 and a driver 25 for the gate wiring.

Figure 17:
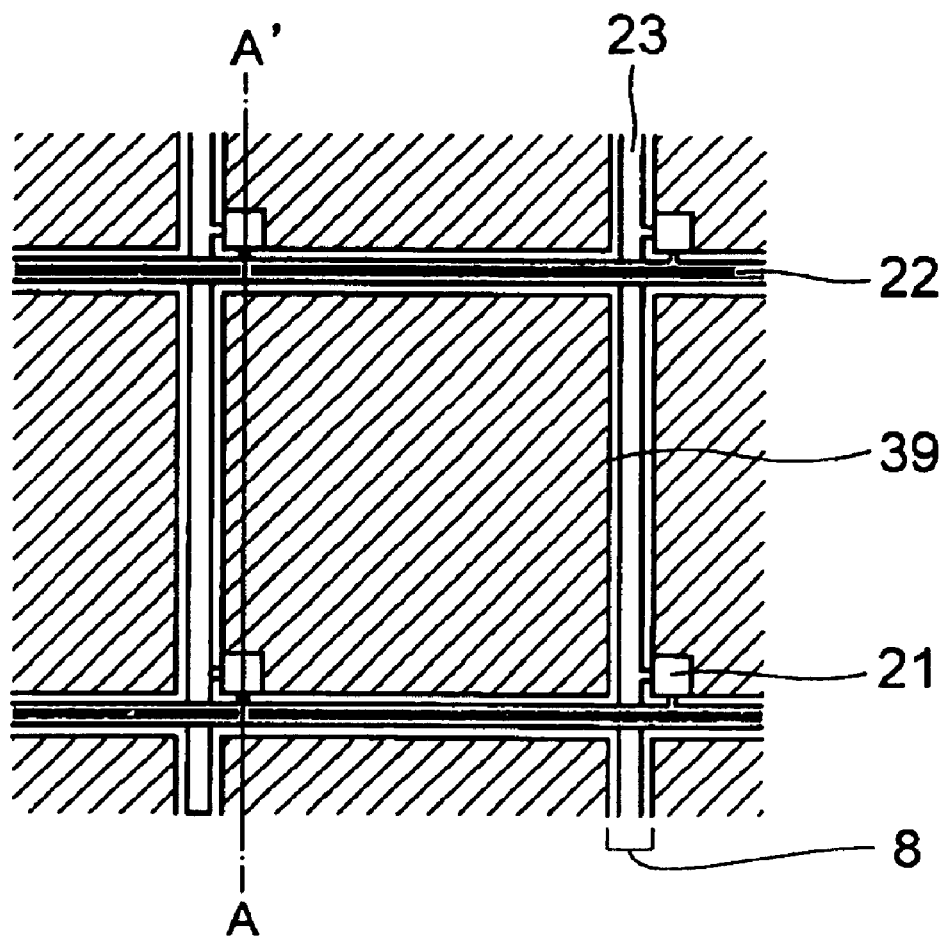
FIG. 17 is a schematic view illustrating the structure of the second substrate in FIG. 16 as viewed from the image surface.

FIG. 17 is a schematic view illustrating the structure of the second substrate in FIG. 16 as viewed from the image surface. In FIG. 17, the thin film transistors 21, the drain wires 22 and the gate wires 23 are all arranged on the second substrate, and the liquid-repellency parts 8 are arranged at the locations illustrated in the figure. The above described first electrode 3 is arranged on the first electrode 1 not shown in the FIG. 17, and the adjacent pixels are commonly connected (not shown in the figure). The above described second electrodes 4 are each connected with one of the thin transistors 21. Then, description will be made with reference to a sectional view including the thin film transistors 21 in combination with the structures of the above described examples.

FIG. 18 is a schematic sectional view along the line segment A–A' shown in FIG. 17, illustrating the portion involving one thin film transistor. FIG. 18 shows an electrophoretic display in which the pixel is the one having the structure of Example 1. The reference numerals respectively correspond to the reference numerals allotted to the parts having the same functions in the above described examples. In FIG. 18, the second electrode 4 is connected to the source electrode 37 of the thin film transistor 21 through the intermediary of a through hole. The thin film transistor 21 comprises a gate electrode 31, an insulating film 32, a semiconductor layer 33, a contact layer 34 and 35, a drain electrode 36 and a source electrode 37. The first electrode 3 is connected between the adjacent pixels and is made to be a common electrode. Thus, active matrix driving is made possible.

Now, description will be made below on a manufacturing method of the electrophoretic of the present invention, in particular, on the step for forming the liquid-repellency parts and the repellency-lowered parts on the first substrate and the second substrate and on the step for providing the insulating liquid to the repellency-lowered parts on both substrates.

FIG. 19 is a schematic view illustrating the manufacturing steps of the electrophoretic display of the present invention, and corresponds to the manufacture of the above described electrophoretic display of Example 1. In a step shown in FIG. 19A for arranging the liquid-repellency parts on the second substrate, a liquid-repellency treatment is made all over the surface of the second substrate 2 to form the liquid-repellency parts 8 all over the surface of the substrate. The liquid-repellency parts 8 are formed by the liquid-repellency liquid coating methods based on the liquid phase processes including the spin coat method, the dip coat method and the like, or by the vapor phase processes including the plasma processing in the atmosphere of the liquid-repellency gas and the like. FIG. 19B shows a next step in which light irradiation is made onto the portions on which the insulating liquid is to be provided, and thus the repellency-lowered portions are formed by lowering the liquid repellency of the light irradiated parts. In this step, the light 16 is irradiated through a photomask 27, and the light irradiated parts are made to lose liquid repellency and to be transformed into the repellency-lowered parts 9. In this connection, the liquid repellency may be incompletely eliminated so as for the repellent liquid to be modified so that the liquid repellency is lowered and the irradiated parts become the repellency-lowered parts.

Figure 19A:
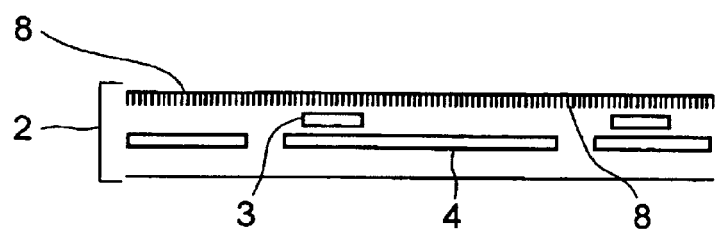
FIGS. 19A, 19B, 19C and 19D are schematic view illustrating the manufacturing steps of the electrophoretic display of the present invention.
Figure 19B:
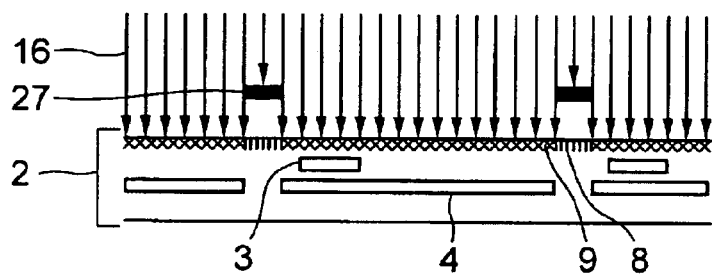
Figure 19C:
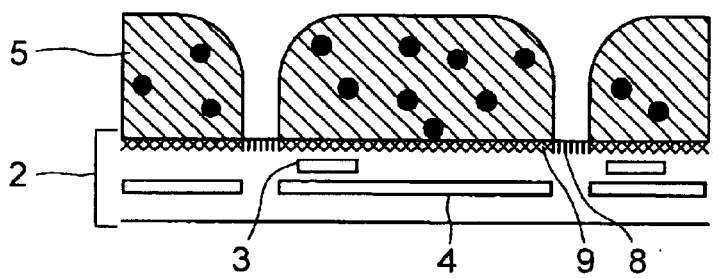
Figure 19D:
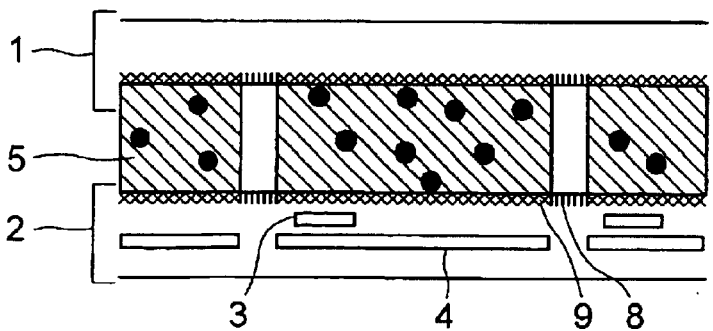

Then, a structure as shown in FIG. 19C is obtained through the step for providing the above described insulating liquid 5 to the repellency-lowered parts 9 formed by the above described light irradiation. Thereafter, an electrophoretic display having a structure shown in FIG. 19D is obtained by laminating, on the above described insulating liquid, the first substrate 1 having the same liquid-repellency parts 8 and the same repellency-lowered parts 9 formed thereon. Incidentally, in the step for providing the insulating liquid 5 to the repellency-lowered parts 9, the insulating liquid 5 provided to the liquid-repellent parts 8 is attracted to the repellency-lowered parts 9 so that it is possible to provide the insulating liquid 5 exclusively to the repellency-lowered parts 9; thus, if the repellency-lowered parts 9 are formed in a grid pattern, it is possible to simply manufacture an electrophoretic display in which the insulating liquid 5 is divided into compartments without using partition walls.

Additionally, in the above described step for providing a liquid-repellency layer, at the beginning as a base for the layer, a layer for absorbing the light irradiated for the purpose of lowering the liquid repellency may be formed on the substrate, and a liquid-repellency layer may be provided thereon (not illustrated with a figure). Such a preformation of the light absorbing layer makes it possible to form the patterns of the liquid-repellency parts and the repellency-lowered parts by eliminating or modifying the liquid-repellency layer with the aid of the heat generated in the irradiated parts when the light of 250 nm or longer in wavelength (for example visible light) is irradiated. Accordingly, a process in vacuum involved in the ultraviolet light irradiation can be eliminated and simpler steps can manufacture an electrophoretic display.

Figure 20A:
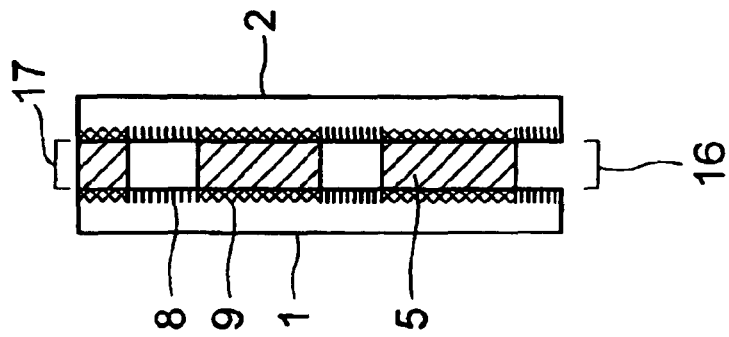
FIGS. 20A, 20B and 20C are schematic view illustrating the step for providing an insulating liquid to the repellency-lowered parts of the electrophoretic display of the present invention in a manufacturing method other than that illustrated in FIG. 19.
Figure 20B:
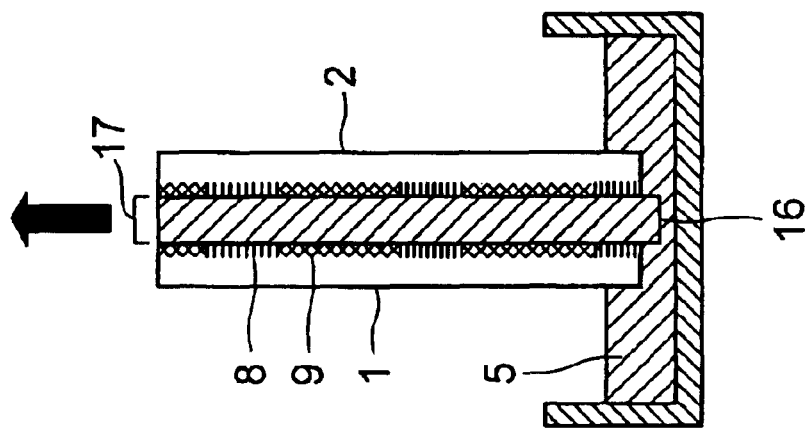
Figure 20C:
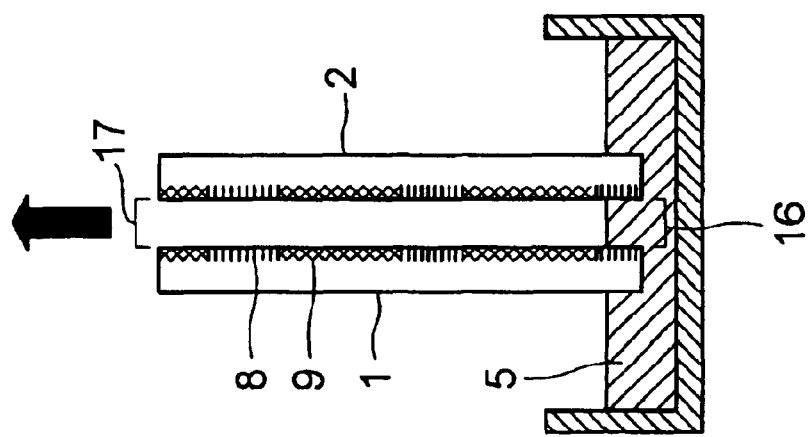

FIG. 20 is a schematic view illustrating the step for providing an insulating liquid to the repellency-lowered parts of the electrophoretic display of the present invention in a manufacturing method other than that illustrated in FIG. 19. As FIG. 20 shows, the first substrate 1 and the second substrate 2 beforehand provided with the liquid-repellency parts 8 and the repellency-lowered parts 9 are laminated with a predetermined gap and a sealing opening 16 arranged in the gap, then the above described sealing opening 16 is submerged into the insulating liquid 5 (FIG. 20A), and thus, the insulating liquid 5 is sealed between the two substrates by evacuating to a vacuum the space between the two substrates (FIG. 20B). Thereafter, the sealing opening 16 is separated from the insulating liquid 5, and consequently the unnecessary insulating liquid provided to the liquid-repellency parts 8 is discharged from the sealing opening 16 or the gas discharge opening 17. In this way, an electrophoretic display can be manufactured in which the insulating liquid is simply divided into compartments with the aid of a gas as the partition walls, without using as the partition walls such resins as described in the examples with reference to FIG. 8 and the like (FIG. 20C). In this connection, evacuation to a vacuum may be made from the gas discharge opening 17 to accelerate the discharge of the unnecessary insulating liquid. Alternatively, the insulating liquid may be sealed between the two substrates by pressurizing the insulating liquid 5, instead of the evacuation to a vacuum.

Figure 21A:
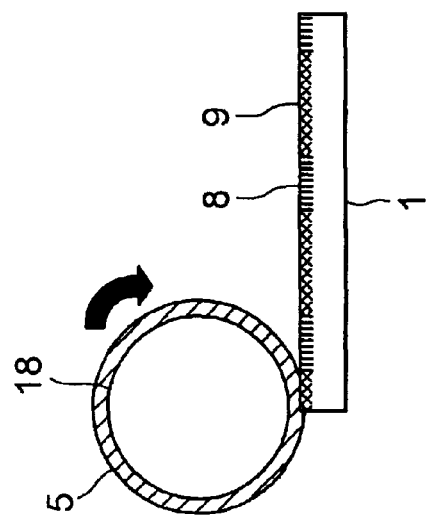
FIGS. 21A, 21B and 21C are schematic view illustrating another example of other manufacturing steps of the electrophoretic display of the present invention.
Figure 21B:
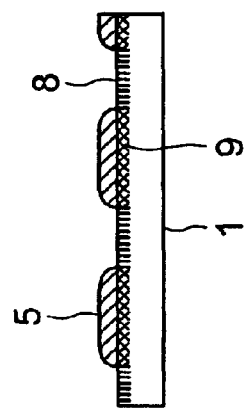
Figure 21C:
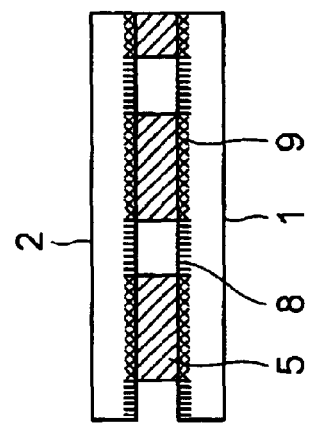

FIG. 21 is a schematic view illustrating another example of other manufacturing steps of the electrophoretic display of the present invention. The manufacturing steps also correspond to the manufacture of the electrophoretic display of Example 1. In the step for providing the insulating liquid 5 to the repellency-lowered parts 9, as FIG. 21 shows, a roller 18 with the insulating liquid 5 adhering thereto in a predetermined thickness is rolled on the first substrate 1 beforehand provided with the liquid-repellency parts 8 and the repellency-lowered parts 9 on the surface thereof (FIG. 21A) in such a way that the insulating liquid 5 is provided exclusively to the repellency-lowered parts 8 of the above described substrate (FIG. 21B). Then, the first substrate 1 is laminated with a predetermined gap to the second substrate 2 having the same liquid-repellency parts 8 and the same repellency-lowered parts 9 on the surface thereof. In this way, as described with reference to FIGS. 10 to 20, it becomes possible to simply divide the insulating liquid into compartments with the aid of gas partition walls (FIG. 21C). In this case, by making the thickness of the insulating liquid adhering to the roller 19 agree with the gap with which the first substrate 1 and the second substrate 2 are laminated, or by making the thickness concerned thick so as for the adjacent compartments of the insulating liquid not to contact each other, the insulating liquid 5 can be made to contact the first substrate 1 and the second substrate 2 without failure. Accordingly, it is possible to divide the insulating liquid into compartments with the aid of gas partition walls. Incidentally, in this case, the insulating liquid 5 is provided to the first substrate 1, but the insulating liquid 5 may also be provided to the second substrate.

FIG. 22 is a schematic view illustrating yet other manufacturing steps of the electrophoretic display of the present invention. The manufacturing steps also correspond to the manufacture of the electrophoretic display of Example 1. At the beginning, the first substrate 1 beforehand provided with the liquid-repellency parts 8 and the repellency-lowered parts 9 on the surface thereof is soaked in the insulating liquid 5 (FIG. 22A), then the first substrate 1 is taken out to arrange the insulating liquid 5 exclusively on the repellency-lowered parts 8 of the first substrate 1 (FIG. 22B). Then, the first substrate 1 is laminated with a predetermined gap to the second substrate 2. Accordingly, the insulating liquid can be simply divided into compartments with the aid of gas partition walls (FIG. 22C). In this case, the adhesion amount of the insulating liquid 5 onto the repellency-lowered parts 9 of the first substrate 1 can be adjusted by varying the surface tension and viscosity of the insulating liquid 5 and the surface tension and viscosity of the repellency-lowered parts 9. Here, the insulating liquid 5 is provided to the first substrate 1, but the insulating liquid 5 may also be provided to the second substrate 2.

Figure 23A:
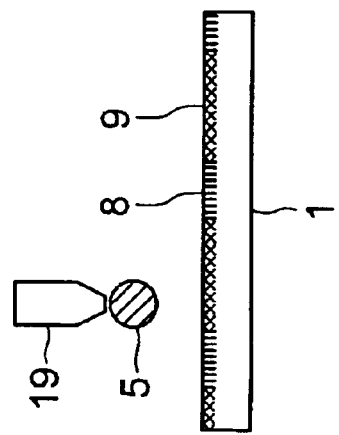
FIGS. 23A, 23B and 23C are schematic view illustrating further yet other manufacturing steps of the electrophoretic display of the present invention.
Figure 23B:
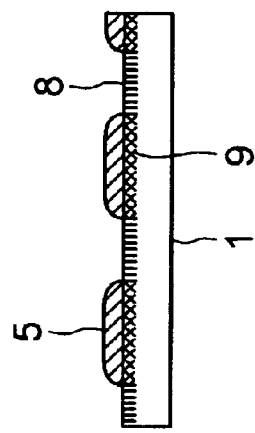
Figure 23C:
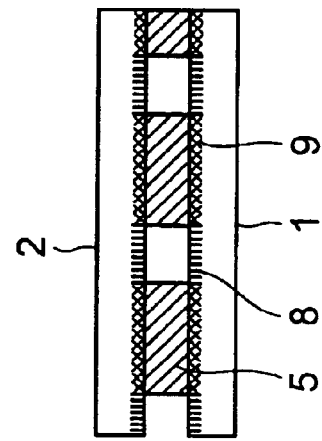

FIG. 23 is a schematic view illustrating further yet other manufacturing steps of the electrophoretic display of the present invention. The manufacturing steps also correspond to the manufacture of the electrophoretic display of Example 1. In FIG. 23, in the step for providing the insulating liquid 5 to the repellency-lowered parts 9, an appropriate amount of the insulating liquid 5 is discharged by means of an inkjet device 19 to the repellency-lowered parts 9 of the first substrate 1 beforehand provided with the liquid-repellency parts 8 and the repellency-lowered parts 9 on the surface thereof (FIG. 23A), and thus the insulating liquid 5 is provided exclusively to the repellency-lowered parts 9 of the substrate (FIG. 23B). Then, the substrate 1 thus processed is laminated with a predetermined gap to the second substrate 2 having the same liquid-repellency parts 8 and the same repellency-lowered parts 9 on the surface thereof. Accordingly, the insulating liquid can be simply divided into compartments without using partition walls (FIG. 23C). Here, the insulating liquid 5 is provided to the first substrate 1, but the insulating liquid 5 may also be provided to the second substrate 2.

Figure 24A:
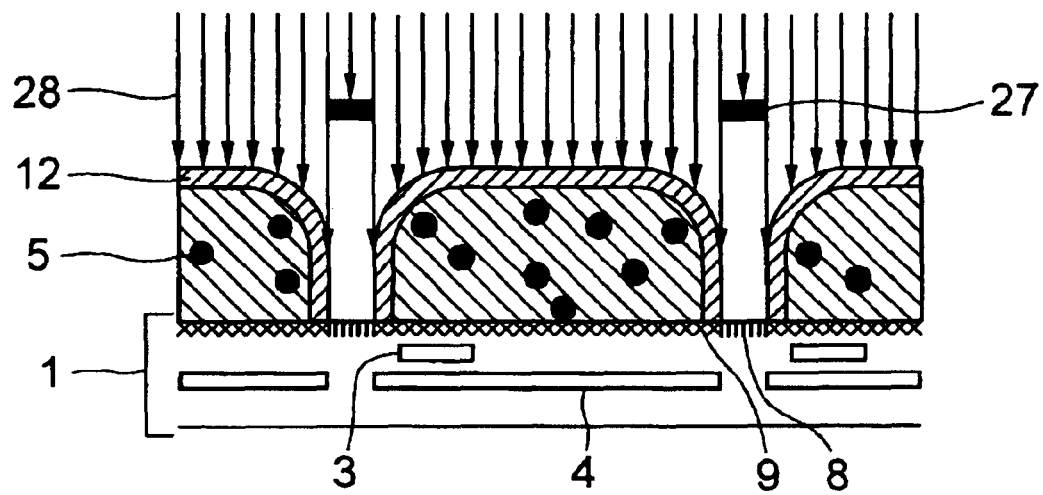
FIGS. 24A and 24B are schematic view illustrating further yet other steps in the manufacturing steps of the electrophoretic display of the present invention.
Figure 24B:
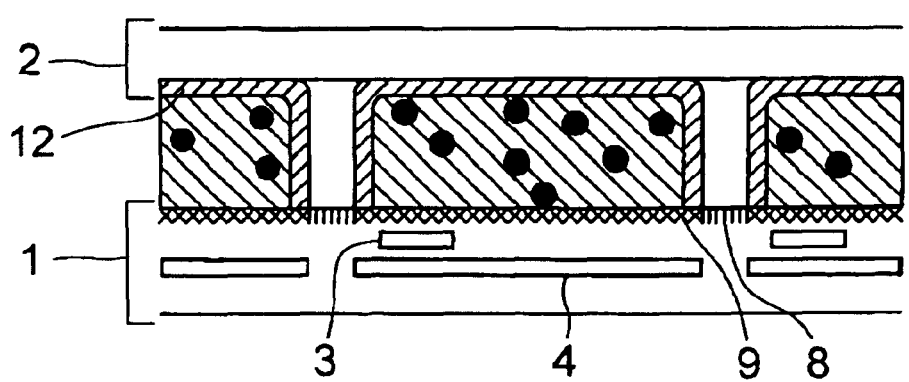

FIG. 24 is a schematic view illustrating further yet other steps in the manufacturing steps of the electrophoretic display of the present invention. The manufacturing steps also correspond to the manufacture of the electrophoretic display of Example 1. In the present example, in the step for covering the circumference of the compartments of the insulating liquid 5 with a resin film 12, a photocuring material to form the resin film 12 is beforehand added to the insulating liquid 5, and the insulating liquid 5 is provided exclusively to the repellency-lowered parts 9 of the first substrate 1 according to any one of the steps described above with reference to FIGS. 19 to 23. As FIG. 24A shows, under this condition, light 28 is irradiated through a photomask 27 to the parts to be covered with the resin film 12, and thus the resin film 12 is formed to cover the compartments of the insulating liquid 5. Then, as FIG. 24B shows, the second substrate 2 is laminated with a predetermined gap to the first substrate 1 in which the surface of the compartments of the insulating liquid 5 is covered with the resin film 12. Accordingly, the insulating liquid can be simply divided into compartments without using partition walls.

Incidentally, a photocuring material to form the resin film 12 may be added by means of spraying after the insulating liquid 5 has been provided exclusively to the repellency-lowered parts 9 on the first substrate 1 according to any one of the steps described above with reference to FIGS. 19 to 23. Additionally, by making the specific gravity of the material to form the resin film 12 smaller than the specific gravity of the insulating liquid 5, the surface of the compartments of the insulating liquid is covered with the material to form the resin film 12, and then the material is cured to from the resin film 12 so that the material to form the resin film 12 hardly remains in the insulating liquid 5. Through these steps, an electrophoretic display can be manufactured in which the insulating liquid is firmly divided into compartments. Similarly, the resin film 12 may be formed by thermosetting after a thermosetting material to form the resin film 12 has been added to the insulating liquid.

Examples of the materials for the substrate 1 in each of the above described examples of the present invention include glass substrates, quartz substrates, and various polymer substrates on which electrodes and the like are to be laminated, and it is preferable that the materials concerned simultaneously have insulation characteristics, high transmittance for the visible light region and high mechanical strengths. Examples of the second substrate 2 include glass substrates, quartz substrates, various polymer substrates, and metal substrates each having an insulating layer on the surface thereof on which electrodes and the like are to be laminated, and it is preferable that the substrates simultaneously have insulation characteristics and high mechanical strengths.

For the first electrode 3, the following materials can be used: materials having high reflectivity in the visible light region such as aluminum, aluminum alloys, silver, silver alloys, gold, copper, platinum, chromium, nickel, molybdenum, tungsten, titanium and the like; transparent materials such as indium tin oxide and the like; and black materials such as carbon, titanium carbide, chromium and silver subjected to surface oxidation treatment, and the like. Additionally, non-black electrodes can be used as the first electrode 3 through adhering black materials onto these electrodes. It is preferable that these materials are highly conductive, and from the viewpoint of the contrast ratio, it is preferable that these materials are black. Besides, it is preferable that these materials are high in transmittance when the first electrode 1 is formed as the common electrode on the first substrate.

For the second electrode 4, the following materials are preferable: materials having high reflectivity in the visible light region such as aluminum, aluminum alloys, silver, silver alloys, gold, copper, platinum, chromium, nickel, molybdenum, tungsten, titanium and the like; highly conductive materials such as transparent indium tin oxide and the like; and black materials from the viewpoint of the contrast ratio. Additionally, materials high in reflectivity are preferable for the second electrode when the second electrode is used as the reflector of a reflection type display, while materials high in transmittance are preferable when the second electrode is used in a transmission type display.

For the insulating liquid 5, transparent materials such as xylene, toluene, silicon oil, liquid paraffin, organic chlorides, various hydrocarbons, various aromatic hydrocarbons and the like can be used each alone and in combinations thereof. Materials high in transmittance are preferable from the viewpoint of the light utilization efficiency. As a colored insulating liquid, a transparent insulating liquid added with an appropriate amount of a dye can be used. From the viewpoint of the operation life, it is preferable that the insulating liquid has a high insulation degree so that no ions are generated when voltage is applied, while from the viewpoint of the migration velocity, it is preferable that the insulating liquid has a low viscosity. Additionally, from the viewpoint of dividing the insulating liquid into compartments, it is preferable that the insulating liquid has a large difference between the contact angle to the liquid-repellency parts 8 and the contact angle to the repellency-lowered parts 9.

For the charged particles 6, various organic pigments and inorganic pigments can be used, and various colors can be selected depending on the selected materials. As black pigments, for example, carbon black, graphite, black iron oxide, ivory black, chromium dioxide and the like can be used each alone or in combinations thereof. As white pigments, for example, titanium dioxide, magnesium oxide, barium titanate and the like can be used. Furthermore, it is preferable to use pigments for which the dispersion characteristics are improved by coating these pigments with dispersants such as acrylic polymers and the like, and the zeta potential of the particles is enhanced with the aid of a surfactant, because the stability and response speed of the charged particles are improved.

For the insulating layer 7, acrylic photosensitive resins, nonphotosensitive resins and inorganic insulating layers can be used. The insulating layer can be colored with dyes and the like, and can display a color in contrast to the color of the charged particles. For the liquid-repellency parts 8, alkoxysilane compounds, fluoro-containing aminosilane compounds and the like can be used, and those materials which have large contact angles to the insulating liquid are preferable. For the repellency-lowered parts 9, hydroxy group, carboxylic acid group and sulfonic acid group can be cited, and the materials each having a high transmittance and a small contact angle to the insulating liquid are preferable.

For the resin film 12, various types of resins including photocuring type resins, thermosetting type resins, condensation-polymerization curing type resins and the like can be used; examples of the photocuring type include acrylic acids having long chain alkyl groups or benzene rings, acrylates having long chain alkyl groups or benzene rings and the like. Materials high in transmittance are preferable. Additionally, preferable are those materials which have the characteristics such that the materials are soluble in the insulating liquid 5, the specific gravities of the materials are largely different from the specific gravity of the insulating liquid 5 and the like, depending on the curing methods involved.

For the resin 13, various types of resins can be used, and thermosetting and photocuring resins may be used to be cured after having been provided between the compartments of the insulating liquid. Additionally, as black resins, resins mixed with carbon black and black pigments, and the like can be used. Materials low in viscosity are preferable for the purpose of providing the materials between the compartments of the insulating liquid. For the conductive resin 14, the resin 13 kneaded with metals, carbon and the like and the resin 13 with ions driven thereinto can be used. Alternatively, sheet-like materials with adhered transparent electrodes such as ITO and the like may be used. Resins high both in transmittance and in conductivity are preferable. For the spacer members, various types of polymer beads, silica beads and fibers can be used; materials high in liquid repellency or materials enhanced in liquid repellency through coating with liquid-repellency materials are preferable.

As described above, according to the present invention, an electrophoretic display can be provided in which an insulating liquid can be divided into compartments each corresponding to one pixel, on the basis of a simple structure, with the aid of the liquid-repellency parts and the repellency-lowered parts on the surface of the substrates, and the insulating liquid can be uniformly arranged in the respective microspaces so that display characteristics uniform in the display surface are actualized.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An electrophoretic display comprising a transparent first substrate and a second substrate arranged with a predetermined gap therebetween, an insulating liquid provided in said gap, charged particles dispersed in said insulating liquid, and a first electrode and a second electrode arranged on either of said first substrate and said second substrate, wherein:

the display comprises liquid-repellency parts and repellency-lowered parts on the surface of said first substrate and the surface of said second substrate, and said insulating liquid is provided to the repellency-lowered parts of said first substrate and said second substrate as compartments.

2. The electrophoretic display according to claim 1, wherein the display comprises a plurality of spacer members on said liquid-repellency parts, and the surface of said spacer members has liquid repellency against said insulating liquid.

3. The electrophoretic display according to claim 1, wherein the display comprises banks, higher than the surroundings thereof, in the boundary parts between the adjacent compartments of the insulating liquid provided to said repellency-lowered parts on either of said first substrate and said second substrate or on both substrates.

4. The electrophoretic display according to claim 1, wherein the surface of the insulating liquid is covered with a transparent resin, and said resin is provided to the gaps between said adjacent compartments of the insulating liquid each covered with said resin film.

5. The electrophoretic display according to claim 4, wherein the resin, provided to the gaps between the adjacent compartments of the insulating liquid each covered with said resin film, has conductivity and doubles as said first electrode.

6. The electrophoretic display according to claim 5, wherein a transparent conductive resin fills the gap between the compartments of the insulating liquid and said first substrate and the gaps between the adjacent compartments of the insulating liquid.

7. The electrophoretic display according to claim 1, wherein the compartments of the insulating liquid each covered with said resin film are nearly semispherical.

8. The electrophoretic display according to claim 1, wherein active elements are arranged on said second substrate and the display is switched over on the basis of the active matrix driving.

* * * * *